No. 836,359.  
PATENTED NOV. 20, 1906.  
B. A. BEHREND.  
METHOD AND APPARATUS FOR TESTING ALTERNATORS.  
APPLICATION FILED JULY 11, 1904.
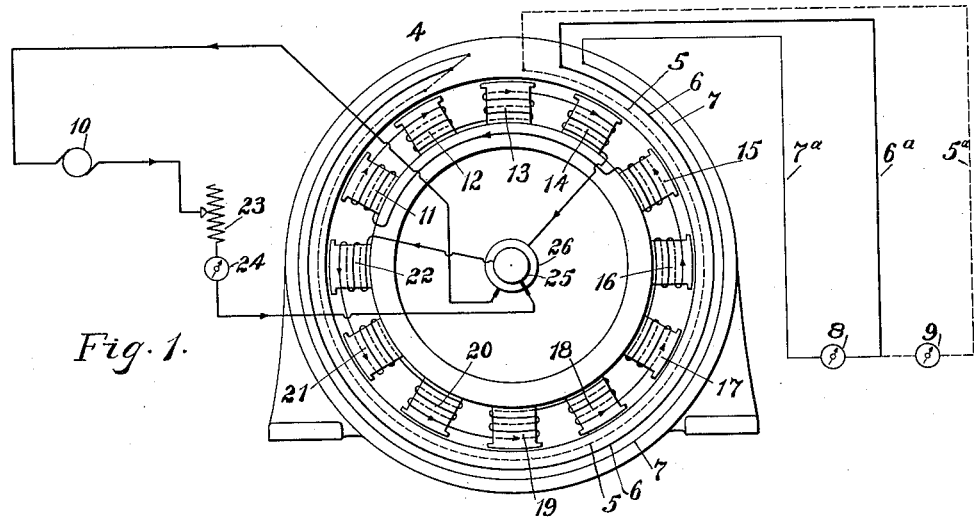
Fig. 1.
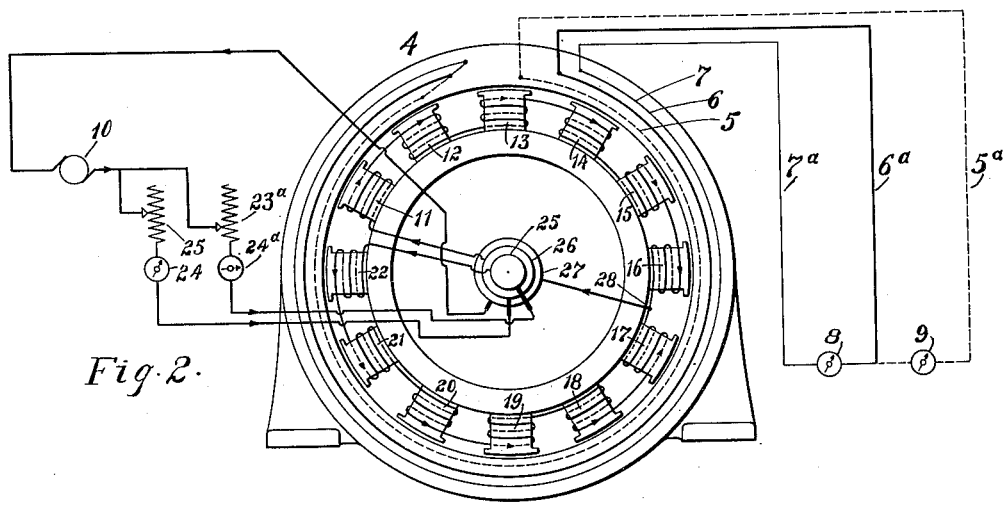
Fig. 2.
Fig. 3.
Witnesses:  
George J. Schwartz  
Geo. A. Keidel
Inventor:  
Bernard A. Behrend  
By  
Chas. E. Lord  
Attorney.

UNITED STATES PATENT OFFICE.

BERNARD A. BEHREND, OF NORWOOD, OHIO, ASSIGNOR, BY MESNE ASSIGNMENTS, TO THE BULLOCK ELECTRIC MANUFACTURING COMPANY, A CORPORATION OF OHIO, AND ALLIS-CHALMERS COMPANY, A CORPORATION OF NEW JERSEY.

METHOD AND APPARATUS FOR TESTING ALTERNATORS.

No. 836,359.     Specification of Letters Patent.     Patented Nov. 20, 1906.

Application filed July 11, 1904. Serial No. 216,022.

*To all whom it may concern:*

Be it known that I, BERNARD A. BEHREND, a citizen of the United States, residing at Norwood, in the county of Hamilton and State of Ohio, have invented certain new and useful Improvements in Methods and Apparatus for Testing Alternators, of which the following is a full, clear, and exact specification.

My present invention relates to method of and apparatus for testing and operating dynamo-electric machines, and particularly to an improved method of operating large alternating-current machines under full-load conditions for testing purposes.

In testing large alternators under full-load conditions of current, voltage, and magnetic flux it is often difficult to find sufficient power to drive the machine, and even where unlimited power is available its use in this manner is so costly as to be prohibitive. In attempting to overcome these difficulties various methods of testing have been suggested—such, for instance, as the well-known method of circulating power between a direct-current generator and a motor which are electrically and mechanically connected. It has also been suggested to circulate power in alternating-current machines of the synchronous type by using a single machine and connecting the armature-coils in opposition in such a manner that the machine is operated at full current and full magnetic flux. This latter method as applied, for instance, to a single-phase generator having twenty poles would be carried out by splitting the armature into two sections of eight and twelve coils, respectively, and by connecting these sections in opposition, so that only four coils would be effective in regard to the circulation of current in the armature. The section of the armature which contains eight coils acts as a motor, while the section containing twelve coils acts as a generator. The current which circulates through the armature-coils is almost in quadrature with the resultant electromotive force and is therefore a wattless current. Hence the eight poles of the motor-section of the machine are strengthened by the armature-current, whereas the twelve poles of the generator-section of the machine are weakened by the same current. This leads to a magnetic unbalancing of the machine, as the motor-fields carry more resultant flux than the generator-fields. In modern large alternating-current generators containing a large amount of iron in the armature this method cannot be used on account of the magnetic unbalancing which sets up mechanical stresses and strains, which if allowed to continue would be very injurious to the machine. It has also been suggested instead of dividing the armature into sections and connecting these sections in opposition in polyphase machines of the revolving-field type to split the field into two sections and connect these sections in such a manner that the electromotive forces induced in the armature are in opposition. This method also is not applicable to large alternating-current generators on account of the magnetic unbalancing of the machine.

The main object of my invention is to test modern large alternating-current machines in a simple, inexpensive, and efficient manner, to do away with all magnetic unbalancing of the machine and the mechanical stresses and strains incident thereto, and thereby determine the heating or $C^2R$ losses of the armature and field, the core loss, the temperature rise, and all desired data under full-load conditions of operation, and also to determine the regulation of the machine at different current strengths.

My invention, therefore, comprises the method of operating alternating-current machines for testing purposes which consists in dividing the field into sections wound to act as motor and generator, respectively, and using different exciting-currents for the motor-section and the generator-section of the field-winding, so that the resultant magnetic field produced by the interaction of the impressed and induced fields are the same for each pair of field-poles and the machine is in perfect magnetic balance.

The invention also consists of the means for testing alternators by the circulation-of-power method, said means comprising the connections between two sections of the field-winding wound in opposition and a source of exciting-current supply, together with means for regulating the current from said source, so that the current strength in the field-winding sections are different.

In the accompanying drawings, Figure 1 represents diagrammatically the connections employed in carrying out the method of testing alternators upon which my present invention is an improvement. Fig. 2 represents diagrammatically the connections employed in the preferred embodiment of my invention; and Fig. 3 represents graphically at A the induction in the air-gap produced by the armature-current at B, the poles of the revolving field, and at C the curves of resultant magnetism in the method employing equal exciting-current and in my improved method employing unequal exciting-currents.

Referring now to Fig. 1, the twelve-pole alternating-current generator 4 is provided with a three-phase armature-winding, (indicated at 5, 6, and 7,) which is connected to the mains 5ª, 6ª, and 7ª, respectively, which are connected through the measuring instruments 8 and 9. The field-coils are connected to the source of exciting-current supply 10 in such a manner that the field-coils 11 to 14, inclusive, induce in the armature-winding an electromotive force in opposition to that induced by the remaining coils 15 to 22, inclusive. The circuit connections from the source 10 may be traced as follows: from one terminal of 10 through the adjustable resistance 23, measuring instrument 24, collector-ring 25, field-coils 22, 21, 20, 19, 18, 17, 16, and 15 in the direction shown by the arrow-heads, so as to produce alternate north and south poles, then through coils 11 to 14, inclusive, so as to produce alternate north and south poles in opposition to those produced by coils 15 to 22, inclusive, then through collector-ring 26 to the opposite terminal of 10. The current induced in the armature-winding 5, 6, and 7 strengthens the magnetism of the poles carrying coils 11 to 14, inclusive, as these act as the poles of the motor-section, and the same armature-current weakens the poles carrying coils 15 to 22, inclusive, and acting as the generator-section. This effect is shown graphically in Fig. 3, in which the vertical line $ab$ represents the dividing-line between the motor-section of the machine on the left and the generator-section of the machine on the right. The ordinates of the sinusoidal line at A represent at a certain moment of time the induction in the air-gap as produced by the armature-current. The poles of the revolving field are represented below this curve in their respective phase relations, the armature-current being in quadrature with the electromotive force, and therefore in phase with the field. The curve of resultant magnetism is plotted at C and is represented by the wavy dotted line R. A glance at this line shows that the induction under the poles of the motor-section is far in excess of the induction under the poles of the generator side, and it is therefore obvious that a machine connected in this manner, being magnetically unbalanced, must be subject to most violent vibrations. In carrying out my improved method of testing I overcome the difficulties of magnetic unbalancing and violent vibration by using different exciting-currents for the motor-section and for the generator-section of the revolving field, so that the resultant field produced by the interaction of the impressed and induced fields is the same for each pair of poles—that is, so that the resultant magnetic flux per pole is a certain definite value all around the periphery of the rotating member.

Referring now to Fig. 2, the twelve-pole alternator 4 is provided with armature connections similar to those described with reference to Fig. 1. The field-coils are connected so that six poles induce in the armature-winding an electromotive force in opposition to that induced by the other six poles, and the exciting-current in each section of the field is regulated by a rheostat in series with the coils of said section. This equal division of the poles is not essential to the successful operation of the machine in accordance with my improved method of testing, but is preferred. In Fig. 2 the common point 28 of the fields is connected to a slip-ring 27, which is connected to one side of the exciting-generator 10. Instead of connecting this common point to a separate slip-ring it may be connected to the iron of the fields and the shaft, or even the base of the machine may be used to introduce the current. The circuit connections from the exciting-generator 10 may be traced as follows: through rheostat 25, measuring instrument 24, collector-ring 26, field-coils 11 to 16, inclusive, in the direction shown by the arrows, producing alternate north and south poles forming the motor-section of the machine, thence through the common connection 28, slip-ring 27, to the opposite terminal of 10, also through the rheostat 23ª, measuring instrument 24ª, collector-ring 25, field-coils 22, 21, 20, 19, 18, and 17 in the direction shown by the arrow-heads, producing alternate north and south poles in opposition to the poles produced by coils 11 to 16, inclusive, and forming the generator-section of the machine, thence through the common connection 28, slip-ring 27, to the opposite terminal of 10. Now if the reactions in this case are plotted in Fig. 3 we obtain at C as the curve of resultant magnetism the wavy full line R'. From this line it will be seen that the induction under the poles of the motor side is the same as that under the poles of the generator side. As the exciting-current on the generator side is made greater than the exciting-current on the motor side, neglecting local fields in the armature, the resultant field must be the same or nearly the same for both the motor and generator sections, thus obtaining a perfect balance of the machine, and thereby obviating the trouble that arises from unbalancing.

In the simple method of testing large alternators above described not only can a satisfactory heat run be obtained, but the inductive regulation of the alternator may be determined in all respects equal to that obtained by operating two machines together. In fact, this method of testing alternators by circulating power can be used to carry out with great accuracy all the tests that have to be performed in order to know the characteristics of the machine.

In the appended claims I aim to cover all changes in the herein-described method and all modifications of the apparatus employed in carrying out said method which do not involve a departure from the spirit and scope of my invention.

What I desire to claim as new and to cover by Letters Patent is—

1. The method of operating alternating-current machines for testing purposes, which consists in dividing the field into sections, wound to act as a motor and a generator respectively, and using different exciting-currents for the motor-section and the generator-section of the field-winding so that the resultant magnetic field produced by the interaction of the impressed and induced fields is the same for each pair of field-poles.

2. The method of operating alternating-current machines for testing purposes, which consists in dividing the field-winding into two parts having an equal number of poles, and supplying current to said field-winding parts, so that when the machine is operated one part acts as a motor while the other part acts as a generator, and then regulating the current in the parts of the field-winding, so that a perfect magnetic balance of the machine is obtained.

3. The method of operating alternators for testing purposes which consists in so connecting the field-windings that part of the machine acts as a motor while another part acts as a generator and so varying the strength of current in the parts of the field that the resultant magnetic flux per pole is the same at all points on the periphery of the armature.

4. The method of operating alternating-current machines for testing purposes which consists in providing a divided field-winding and supplying current to said divided field-winding in such a manner that part of the machine acts as a motor and the remaining part acts as a generator and regulating the strength of said current so that the resultant magnetic flux per pole is a certain definite value all around the periphery of the rotating member.

5. As a means for testing an alternating-current dynamo-electric machine by the circulation-of-power method, the combination of a source of exciting-current supply, connections between said source of supply and a section of the field wound to act as motor independent of connections between said source of supply and another section of the field wound to act as generator, and independent current-regulating means in said connections.

In testimony whereof I affix my signature in the presence of two witnesses.

BERNARD A. BEHREND.

Witnesses:
 VIRGINIA W. PEARNE,
 GRACE P. JONES.